United States Patent [19]

Pollag

[11] Patent Number: 5,661,451
[45] Date of Patent: Aug. 26, 1997

[54] ANTITHEFT SYSTEM FOR MOTOR VEHICLES

[75] Inventor: Christoph Pollag, Reisbach, Germany

[73] Assignee: Bayerische Motoren Werke AG, Germany

[21] Appl. No.: 310,752

[22] Filed: Sep. 23, 1994

[30] Foreign Application Priority Data

Sep. 23, 1993 [DE] Germany .............. 43 32 411.8

[51] Int. Cl.⁶ .................................. B60R 25/10
[52] U.S. Cl. .............. 340/426; 340/825.31; 340/825.34; 307/10.2; 180/287; 382/124; 356/71; 380/23
[58] Field of Search .................. 340/426, 428, 340/430, 825.3, 825.31, 825.32, 825.33, 825.34; 307/10.2, 10.3, 10.4, 10.5, 10.6; 180/287; 382/124, 125, 126, 127; 356/71; 235/380, 382, 382.5, 384; 380/23, 25, 4

[56] References Cited

U.S. PATENT DOCUMENTS

| | | | |
|---|---|---|---|
| 4,151,512 | 4/1979 | Riganati et al. | 382/125 |
| 4,463,340 | 7/1984 | Adkins et al. | 340/428 |
| 4,811,013 | 3/1989 | Akutsu | 180/287 |
| 4,852,680 | 8/1989 | Brown et al. | |
| 5,229,648 | 7/1993 | Sues et al. | 180/287 |

FOREIGN PATENT DOCUMENTS

| | | |
|---|---|---|
| 35 14 241A1 | 10/1986 | Germany . |
| 37 16 811 | 12/1988 | Germany . |
| 37 43 856 | 7/1989 | Germany . |
| 43 31 664 | 6/1994 | Germany . |
| 2 251 503 | 7/1992 | United Kingdom . |
| 81/03002 WO 81 03 | 10/1981 | WIPO . |
| 002A1 | 10/1981 | WIPO . |
| 93/05987 | 4/1993 | WIPO . |

OTHER PUBLICATIONS

Patent Abstract of Japan, JP 63–041268 dated Aug. 6, 1986.

European Searh Report dated Dec. 20, 1995.

Patent Abstracts of Japan, M–1251 May 20, 1992 vol. 16, No. 214, 4–38245.

Germany Patent Office Search Report with English translation.

Primary Examiner—Jeffery Hofsass
Assistant Examiner—Daniel J. Wu
Attorney, Agent, or Firm—Evenson, McKeown, Edwards & Lenahan P.L.L.C.

[57] ABSTRACT

In the case of an antitheft system for motor vehicles comprising several control apparatuses for vehicle components, which can be cleared when a fed testing information corresponds to a predetermined reference information, the testing and the reference data differ from one another for at least two control apparatuses.

11 Claims, 1 Drawing Sheet

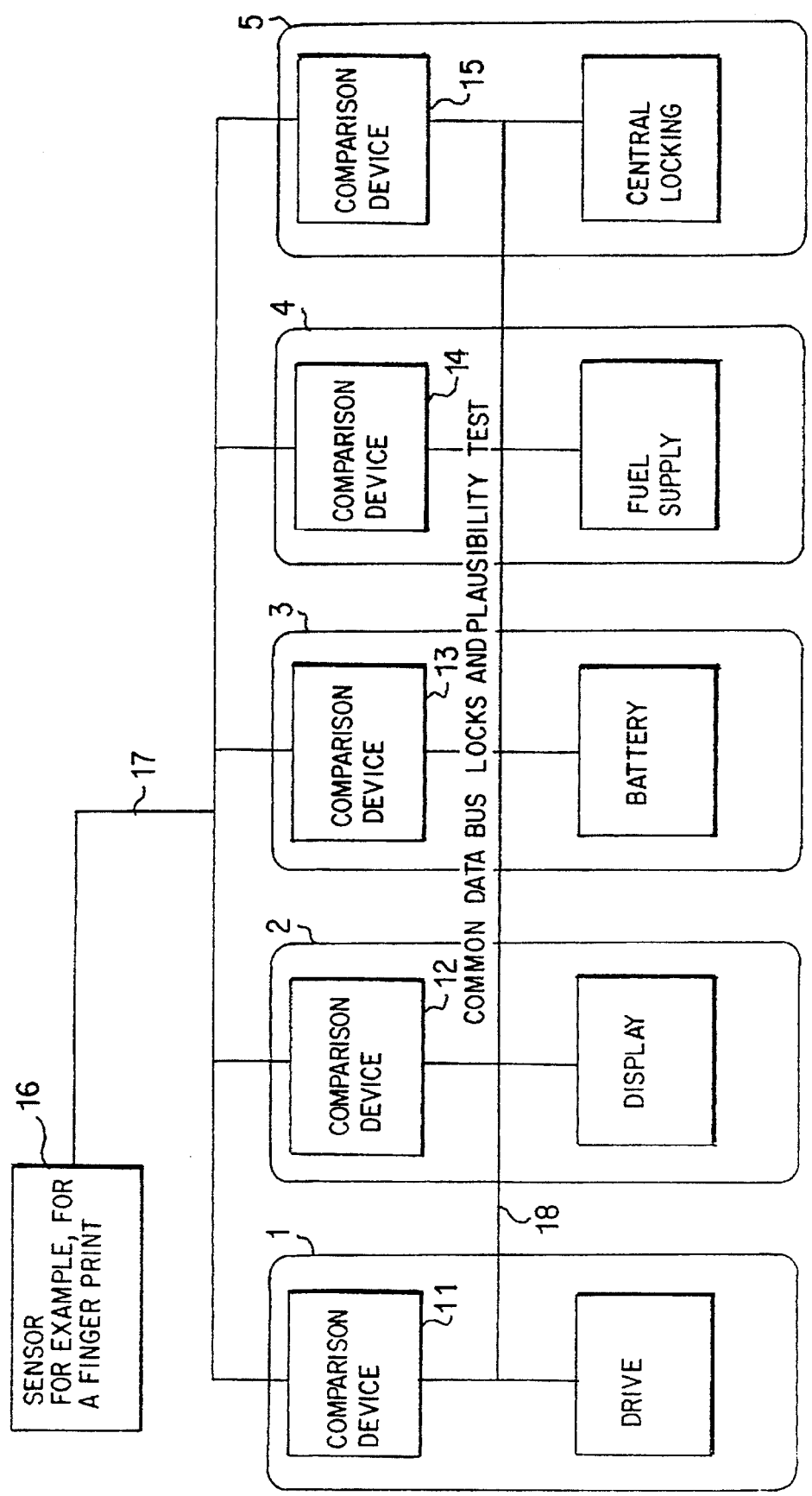

ANTITHEFT SYSTEM FOR MOTOR VEHICLES

BACKGROUND AND SUMMARY OF THE INVENTION

This invention relates to an antitheft system for a motor vehicle which has a plurality of control units for controlling vehicle systems.

A system of this type is discussed, for example, in German Patent Document DE 30 45 345 A1. In such devices, however, the problem arises that by removing the control unit and reading the reference information (such as an image or code data stored therein), or by copying input testing information, it becomes possible for an unauthorized user to operate the control apparatus. This problem is aggravated by the fact that the control apparatus must be removed from time to time for legitimate reasons, such as in the case of a defect, and as a result, the reference information can be ascertained or changed.

It is an object of the present invention to provide an antitheft system of the initially mentioned type which prevents starting of the motor vehicle when testing information which is controlling with respect to a control apparatus is entered.

This and other objects and advantages are achieved by the antitheft system according to the invention, in which each of the several control units has stored therein a different reference code or information, and emits an acknowledgement code, which is transmitted to the other control units when an input test signal matches the stored reference information. Each control unit can be activated only when it has received an input test signal which matches the stored reference information, and in addition, it has also received the proper acknowledgement signals from each of the other control units.

Since different testing and reference information is used to activate at least two of the control units, the vehicle can be started only when the correct testing information for each of the control units is entered into the system. This input expediently takes place via a data bus. Thus, the discovery of the testing or reference information which controls one control unit is without any value, because it can be used to clear only the pertaining control unit.

Since the motor vehicle can be started only with a knowledge of all testing information, the starting of the motor vehicle by the unauthorized user requires the discovery of all testing information, which makes a theft of the motor vehicle virtually impossible.

In principle, it is possible to carry out a comparison of the input testing information with the reference information for each control unit in a centralized manner, for example, in an antitheft safety apparatus of a motor vehicle. However, the degree of protection that is afforded is clearly increased when the control units themselves carry out the comparison with the input testing information, which prevents manipulation at a central unit. Also, in this manner, the required overall expenditures are kept low.

It is particularly advantageous for the testing information to be put in during a joint input operation. The input may take place, for example, by means of a radio transmission path, for example, by infrared or radio signal or in a mechanical manner.

In a preferred embodiment, the testing and reference information comprise image information, which is distinguished by a relatively easy handling capacity, with a high information density. A particularly advantageous example for this purpose is the use of an authorized operator's finger print as image information. Such an access control system is disclosed for example in the journal *VDI Nachrichten*, No. 3, of Jan. 22, 1993, Page 13, in which the finger print has the function of a key. However, the use of this system within the scope of the present invention does not signify a simple application to motor vehicles, but differs in respect of the variety of the testing or reference information which is available for comparison in each of the control units. The finger print therefore does not have the quality of a single key, but rather, supplies a group of keys of which, in an extreme case, only one "fits" a control unit.

However, the use of the access control system known from the journal article is significant in that, there also, a series of images can be obtained from a finger print. Thus, in the antitheft system according to the invention, this means that one of the respective images is in each case controlling with respect to one of the control units. If these image data are acquired during a joint image taking operation, they may, within the scope of the invention; be used for taking the various testing information (=image information) in a joint input procedure.

In principle, it is possible to activate each of the control units when it receives the expected test information. However, as a result, it would then be possible to start the motor vehicle when only those control units are operating which are important for its operation, while less important control units may remain switched off. The degree of theft protection is thus increased when each of the control units emits an acknowledgement signal if the testing and the reference information correspond to one another, and each control unit can be activated only when acknowledgement signals are received from each of the other control units. It thus becomes impossible to manipulate and activate a single control unit, such as the drive assembly, because the start of the operation of the control units depends on the receipt of the acknowledgement signals from the other control units.

Other objects, advantages and novel features of the present invention will become apparent from the following detailed description of the invention when considered in conjunction with the accompanying drawings.

BRIEF DESCRIPTION OF THE DRAWINGS

The single figure illustrates the basic construction of an antitheft system for motor vehicles according to the invention.

DETAILED DESCRIPTION OF THE DRAWINGS

As shown in the Figure, the control units 1 to 5 for, respectively, a drive assembly, a display unit, an energy supply unit, a fuel supply device and a central locking system are integrated with comparison units 11 to 15 to form a constructional unit. Each of the comparison units performs an image comparison between a stored reference image and an image produced by an image input unit 16, which may be, for example, an image taking unit for the finger print of the authorized user which generates different image data. For example, during an image taking operation by unit 16, the finger print is individualized by a white light exposure, by the interposition of a gray filter or by an additional optical or electronic manipulation. In the embodiment as shown in the Figure, five different image signals generated in this manner (for example, different portions of the fingerprint image date) are supplied during a read-in operation via an input line 17 to each of the comparison devices 11 to 15. There, the incoming images are compared with reference images which were previously stored in comparators 11–15 during a preparatory initialization operation.

When each of the comparison devices determines that the stored reference image corresponds to one of the incoming images of the finger print, it generates an acknowledgement signal which is transmitted to the other control units via a common data bus 18. Each of the comparison devices 11–15 also has a memory situated in the control unit which contains the acknowledgement signals expected from the other control units (which naturally differ from one another). If the acknowledgement signals for each of the other control units are received in each of the respective control unit, and one of the incoming images of the finger print corresponds to the stored reference image, the comparison device supplies an actuating signal to the pertaining control unit.

In this manner, it is possible to provide an antitheft system for motor vehicles with the highest possible safety which offers the highest possible protection against manipulation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An antitheft apparatus for a motor vehicle having a plurality of systems for operating said vehicle, each system having a control unit associated therewith, said apparatus comprising:

a plurality of comparison devices, each of said comparison devices being associated with a different one of said respective control units;

each of said comparison devices having stored therein a predetermined reference data set, and being actuatable in response to receipt of a testing data signal which includes a data set that corresponds to said predetermined reference data set, to cause the control unit associated with said comparison device to enable operation of the vehicle system associated with said control unit;

wherein reference data sets for each of at least two of said comparison devices differ from one another.

2. An antitheft apparatus according to claim 1, wherein data sets corresponding to each of said predetermined reference data sets are included in a single testing data signal.

3. An antitheft apparatus according to claim 2, wherein said single testing data signal comprises an image data signal.

4. An antitheft apparatus according to claim 3, wherein said image data signal corresponds to a user's fingerprint.

5. An antitheft apparatus according to claim 1, wherein upon actuation, each of said comparison devices transmits an acknowledgement signal to other comparison devices of said plurality of comparison devices.

6. An antitheft apparatus according to claim 1, wherein each of said comparison devices actuates the control unit associated therewith only upon receipt of acknowledgement signals from all of said comparison devices.

7. An antitheft apparatus for a motor vehicle having a plurality of systems for operating said vehicle, each system having a control unit associated therewith, said apparatus comprising:

means for storing a unique predetermined reference data set in each of said control units, a unique data set stored in each respective control unit differing from unique predetermined reference data sets stored in others of said control units of said systems;

a plurality of comparison means, each one of said comparison means being associated with a control unit of a different respective system of said plurality of systems, each one of said comparison means comparing a testing data signal input thereto with one predetermined reference data set stored in a control unit with which said one of said comparison means is associated, and transmitting an acknowledgement signal to all others of said comparison means when said testing data signal contains data which correspond to said one reference data set, each one of said comparison means being further adapted to supply an actuating signal to the control unit associated therewith to cause the control unit associated with said comparison device to enable operation of the vehicle system associated with said control unit, when said testing data signal contains data which corresponds to said one reference data set, and said one of said comparison means receives acknowledgement signals from all of said comparison means;

wherein reference data sets stored in each of at least two of said comparison means differ from one another.

8. An antitheft apparatus according to claim 7, wherein each of said comparison means emits an acknowledgement signal which differs from that of all others of said comparison means.

9. An antitheft apparatus according to claim 8, further comprising a sensor coupled to provide a single testing data signal to all of said comparison means.

10. An antitheft apparatus according to claim 9, wherein said single testing data signal comprises an image data signal.

11. An antitheft apparatus according to claim 10, wherein said image data signal corresponds to a user's fingerprint.

* * * * *